United States Patent [19]
Suzuki et al.

[11] Patent Number: 4,995,302
[45] Date of Patent: Feb. 26, 1991

[54] NEGATIVE PRESSURE BOOSTER EQUIPMENT

[75] Inventors: Haruo Suzuki; Atushi Satoh, both of Higashimatsuyama, Japan

[73] Assignee: Jidosha Kiki Co., Ltd, Tokyo, Japan

[21] Appl. No.: 409,472

[22] Filed: Sep. 19, 1989

[30] Foreign Application Priority Data

Sep. 21, 1988 [JP] Japan .................. 63-238166

[51] Int. Cl.⁵ .......................................... F15B 9/10
[52] U.S. Cl. .............................. 91/369.3; 91/376 R; 91/519; 91/532; 92/48
[58] Field of Search ............. 92/48; 91/369.3, 376 R, 91/519, 532

[56] References Cited

U.S. PATENT DOCUMENTS

| | | | |
|---|---|---|---|
| 4,494,445 | 1/1985 | Furuta et al. | 91/376 R |
| 4,512,237 | 4/1985 | Endoh et al. | 91/376 R |
| 4,594,937 | 6/1986 | Meynier et al. | 91/376 R |
| 4,653,076 | 2/1987 | Satoh | 91/376 R |
| 4,658,704 | 4/1987 | Mori et al. | 91/376 R |
| 4,718,328 | 1/1988 | Mori et al. | 91/376 R |
| 4,763,561 | 8/1988 | Gautier | 91/369.3 |

*Primary Examiner*—Ronald C. Capossela
*Attorney, Agent, or Firm*—Varndell Legal Group

[57] ABSTRACT

The negative pressure booster equipment according to the present invention is provided with a variable orifice, by which the area of the air passage in the pathways other than one pathway, of two or more pathways communicating two or more variable pressure chambers with atmospheric air, is gradually decreased as the valve plunger moves forward, and it is gradually increased as the valve plunger moves backward in relation to the valve body. Consequently, the pathways other than one pathway are throttled by the variable orifice as the valve plunger moves forward. As the result, most of the air flowing through the control valve is intensively introduced into the variable pressure chamber communicating with the pathway, which is not throttled by the variable orifice, and the pressure in this variable pressure chamber is rapidly increased. As the result, the power pistons under the pressure in this variable pressure chamber is quickly operated, and the rising of the output of the negative pressure booster equipment occurs earlier.

5 Claims, 3 Drawing Sheets

NEGATIVE PRESSURE BOOSTER EQUIPMENT

BACKGROUND OF THE INVENTION

The present invention relates to a negative pressure booster equipment to be used for brake booster and the like, and particularly to a negative pressure booster equipment, in which two or more power pistons are installed in tandem form.

Conventionally, in order to obtain bigger braking power by smaller depressing force on the brake pedal in the brake booster using negative pressure, a tandem type brake booster is used, in which two power pistons are arranged in tandem as described, for example, in the Japanese Provisional Utility Model Publication No. 63-53860.

In such tandem type brake booster, when the brake pedal is depressed for braking, the control valve is switched over, and the air with atmospheric pressure is introduced into two variable pressure chambers divided by two power pistons. By the action of the atmospheric pressure of the introduced air, two pistons are operated. By the action of these power pistons, the master cylinder is operated to generate the braking fluid pressure, and the braking operation is performed. In this case, the piston of the master cylinder is operated by two power pistons, and the maximum braking fluid pressure thus generated is higher than that of the brake booster equipment operated by a single power piston.

However, in such tandem type brake booster, two variable pressure chambers are installed, into which the air with atmospheric pressure is introduced during braking, and the total volume of these chambers is for larger than that of the variable pressure chambers in the brake booster using a single power piston. If the control valve of the same size as the control valve in the brake booster using a single power piston is used, much time is required until the pressure in two variable pressure chambers reaches the pressure to operate two power pistons, and this causes the delay of power piston operation. As shown by the broken line c in FIG. 4, the rising of the output of the brake booster in the initial stage of operation is delayed. Thus, the conventional tandem type brake booster has lower responsiveness than the brake booster using a single power piston.

To increase the responsiveness of the brake booster, various attempts are made to increase the opening of the control valve, or to enlarge the area of passage of the air flowing into the variable pressure chambers. However, when the opening of the control valve is simply increased, the valve stroke must be set at the higher value, and this results in the increase of the loss stroke of the booster. Also, simple enlargement of the area of air passage means the increase of the dimension of the booster in radial direction. Thus, the new problems arise with regard to the performance characteristics and the size of the booster in any of these cases.

SUMMARY OF INVENTION

The object of the present invention is to increase the responsiveness by quickening the rising of output in the initial stage of operation without enlarging the entire booster equipment.

In order to attain the above object, the negative pressure booster equipment according to the present invention is provided with a variable orifice so that, of the pathways communicating with each of the variable pressure chambers and the atmospheric air, the area of the other pathways except one is gradually reduced according to the relative forward movement of the valve plunger in relation to the valve body and that the area is gradually increased according to the relative backward movement of the valve plunger to the valve body.

In the negative pressure booster equipment with such structure based on this invention, when the control valve is switched over by advancing the valve plunger through the input shaft in the operation of the booster, each of the variable pressure chambers is communicated with the atmospheric air through the control valve and the pathway. With the advance of the valve plunger, the area of the air passage is gradually decreased by the variable orifice in the pathways except one. Specifically, these pathways are throttled by the variable orifice. Therefore, the flow rate of the air is limited in the pathways thus throttled. For this reason, the air is not introduced quickly into the variable pressure chambers communicating with these pathways. In contrast, in the variable pressure chamber communicating with the pathway not throttled by the variable orifice, the flow rate of the air is not limited, and the air is quickly introduced. Consequently, most of the air entering through the control valve is introduced into the variable pressure chamber communicating with the pathway not throttled. As the result, the pressure of this variable pressure camber increases as quickly as the pressure in the variable pressure chamber of the booster using a single power piston. Thus, the power position under the pressure of this variable pressure chamber is quickly operated. With the action of this power piston, the valve body advances, and the output from the output shaft is generated. Accordingly, the rising of the output of the negative pressure booster is quickened.

When the valve body advances, the valve plunger moves backward in relation to the valve body, and this gradually increases the passage area of the pathways, where air flow rate is limited by the variable orifice. Thus, the flow rate of the air introduced into the variable pressure chamber communicating with these pathways is also increased. Hence, the power piston under the pressure of the variable pressure chamber is also operated. As the result, the output of the booster equipment is increased.

When the output shaft and the valve plunger are moved backward and the control valve is switched over to release the operation, all variable chambers are shut off from the atmospheric air and are communicated with each of the constant pressure chambers. For this sake, the air in each of the variable pressure chambers is sent into the constant pressure chambers through the control valve. In this case, the valve plunger extensively moves backward in relation to the valve body, and the variable orifice increases the area of the pathway to the maximum. Accordingly, the air in the variable pressure chamber rapidly flows out toward the constant pressure chamber. This leads to the quick return of the power piston and the valve body, and the operation of the booster equipment is quickly stopped.

Still other objects and advantages of the invention will in part be obvious and will in part be apparent from the specification.

The invention accordingly comprises the features of construction, combinations of elements, and arrangement of parts which will be exemplified in the construc-

DESCRIPTION OF PREFERRED EMBODIMENTS

In the following, the embodiments according to the present invention will be described in connection with the drawings.

Figure 1:
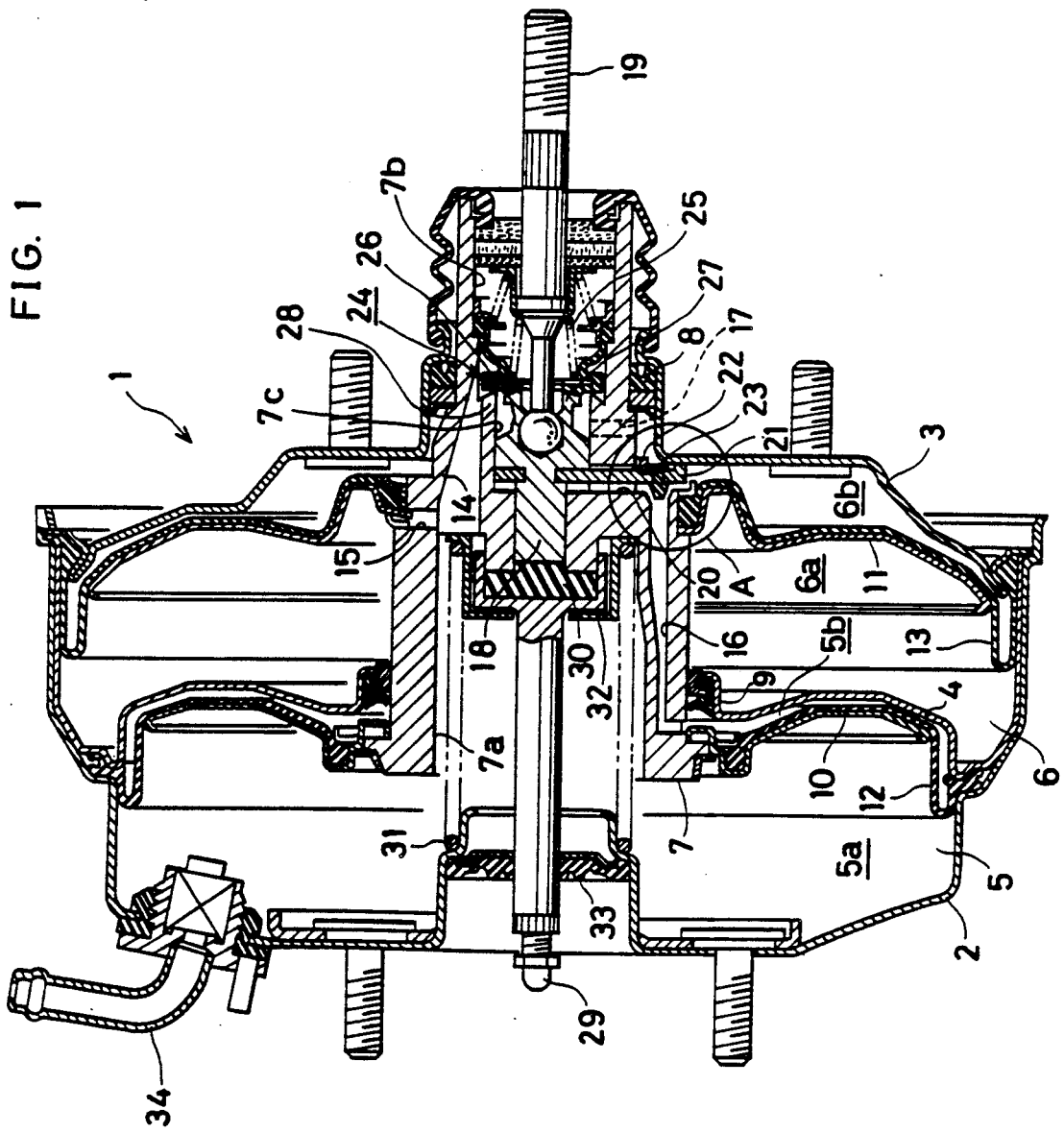
FIG. 1 is a longitudinal sectional view of an embodiment, in which a negative pressure booster equipment according to the present invention is applied to a brake booster.

As shown in FIG. 1, the brake booster 1 is provided with a front shell 2 and a rear shell 3, and the front shell 2 and the rear shell 3 are arranged in such manner to form a big space inside, and they are connected with each other, for instance, by bayonet joint. The spaces in the shells 2 and 3 are divided into a front chamber 5 and a rear chamber 6 by a center plate 4.

A valve body 7 is installed, passing through the rear shell 3 and the center plate 4, and this valve body 7 is supported slidably and in air-tight manner on the rear shell 3 and the center plate 4 using a pair of sealing materials 8 and 9. The front power piston unit 10 and the rear power piston unit 11, provided in the front chamber 5 and the rear chamber 6 respectively, are connected with the valve body 7. A front diaphragm 12 and a rear diaphragm 13 are mounted between the shells 2 and 3 and the valve body 7 on the backside of the two power piston units 10 and 11. The power piston of this invention is composed of the front power piston unit 10 and the front diaphragm 12, and the front chamber 5 is divided into the first constant pressure chamber 5a and the first variable pressure chamber 5b by this power piston. Also the power piston of this invention is also composed of the rear power piston unit 11 and the rear diaphragm 13, and the rear chamber 6 is divided into the second constant pressure chamber 6a and the second variable pressure chamber 6b.

The valve body 7 is provided with a bore 7a opened to the first constant pressure chamber 5a, a bore 7b opened to the atmospheric air and a bore 7c, formed continuously with this bore 7b and having smaller diameter than that of the bore 7b. On the valve body 7, the axial pathway 16 communicating with the second variable pressure chamber 6b and the first variable pressure chamber 5b and the pathway 17 communicating with the second variable pressure chamber 6b and the bore 7c are provided.

Also, a valve plunger 18 is slidably engaged in the bore 7c of the valve body 7. The input shaft 19 coupled with the brake pedal (not shown) is connected with the right end of the valve plunger 18. A key unit 21 protruding into the bore 7c and passing through the radial bore 20 formed on the valve body 7 is engaged with the valve plunger 18 in such manner that no relative movement is possible to axial direction in relation to the valve plunger 18. Therefore, the key unit 21 can move in axial direction together with the valve plunger 18. Also, the withdrawal of the valve plunger 18 from the valve body 7 is prevented by this key unit 21.

Figure 2:
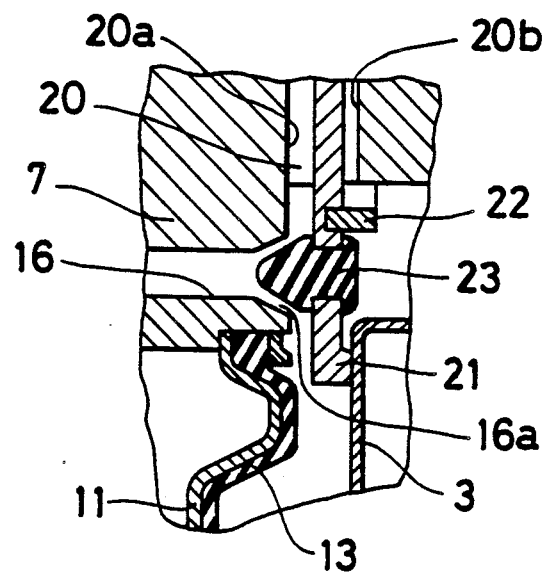
FIG. 2 is an enlarged detail drawing of the portion A in FIG. 1.

As shown in FIG. 2 in detail, the key unit 21 is relatively movable in axial direction by the predetermined distance between the front end wall 20a and the rear end wall 20b of the bore 20 in relation to the valve body 7, and the withdrawal from the valve body 7 is prevented by the retainer 22. On this key unit, a throttling unit 23 made of rubber or the like is mounted at the position face-to-face to the opening 16a of the pathway 16. This throttling unit 23 is arranged in such manner that, when the key unit 21 moves forward in relation to the valve body as the input shaft 19 and the valve plunger 18 move forward, the area of the passage of the opening 16a is decreased as its tip enters into the opening 16a. This limits the flow rate of the air flowing into the pathway 16. Specifically, the area of the passage in the opening 16a varies according to the relative position in axial direction of the valve body 7 and the key unit 21.

Thus, the variable orifice of this invention is composed of the throttling unit 23 and the opening 16a.

A control valve 24 is provided in the bore 7b of the valve body 7. This control valve 24 comprises a valve element 26 which is mounted on the valve body 7 and urged toward the valve plunger 18 by the resilient force of the spring 25 provided between this and the input shaft 19, a first valve seat 27 formed at the right end of the valve plunger 18, and a second valve seat 28 formed on the valve body 7. This control valve 24 is switched over in such manner that, when the valve element 26 is seated on the first valve seat 27 and is separated from the second valve seat 28, the first and the second constant pressure chambers 5a and 6a are communicated with the first and the second variable pressure chambers 5b and 6b, and that the communication of the first and the second variable chambers 5b and 6b with the atmospheric air is interrupted, whereas, when the valve element 26 moves away from the first valve seat 27 and is seated on the second valve seat 28, the communication of the first and the second constant pressure chambers 5a and 6a with the first and the second variable pressure chambers 5b and 6b are interrupted and the first and the second variable pressure chambers 5b and 6b are communicated with the atmospheric air.

On the bore 7a of the valve body 7, an output shaft 29 is provided, and the valve body 7 is slidably engaged in the bore formed at the right end with larger diameter of this output shaft 29. Also, a reaction disc 30 is accommodated in the bore at the right end with larger diameter between the valve body 7 and the output shaft 29. Therefore, the left end of the valve plunger 18 is positioned face-to-face to this reaction disc 30. The withdrawal of the output shaft 29 from the valve body 7 is prevented by the retainer 32, which is pushed rightward by a return spring 31 to return the valve body 7 to the non-operating position. The left end of the output shaft 29 is slidably supported in air-tight manner by the sealing unit 33 and is protruding outwardly from the front shell 2, and the left end thereof is coupled with the piston of the master cylinder (not shown) to be mounted on the front shell 2.

The valve body 7 and each of the power pistons coupled with it are normally supported at the nonoperating position (not shown) by the return spring 31. Under this non-operating condition, the key unit 21 touches the inner surface of the rear shell 3, and this restricts the rightward movement of the valve plunger 18 and supports the valve plunger 18 at the backward limit position. When the input shaft 19 is not operated, the key unit 21 is a little advanced in relation to the valve body 7. In this case, the valve element 26 is seated on both the first valve seat 27 and the second valve seat 28, and the first and the second variable pressure chambers 5b and 6b are interrupted from the atmospheric air and from the first and the second constant pressure chambers 5a and 6a. During the braking operation, therefore, as soon as the valve plunger 18 is operated by the forward movement of the input shaft 19, the valve element 26 and the first valve seat 27 move away from each other, and the first and the second variable pressure chambers 5b and 6b are immediately communicated with the atmospheric air.

The first constant pressure chamber 5a is communicated, for example, with the intake manifold (not shown) through the negative pressure leading-in pipe 34 mounted on the front shell 2. Thus, negative pressure is always introduced into the first and the second constant pressure chambers 5a and 6a.

Next, description will be given on the operation of this embodiment.

When the brake booster 1 is at the non-operating position as shown in the figure, the pressure in the first and the second variable pressure chambers 5b and 6b is a little higher than the pressure in the first and the second constant pressure chambers 5a and 6a, and it is approximately balanced with the resilient force of the return spring 31.

When the brake pedal is depressed for braking, the input shaft 19 advances toward the valve body 7. As the input shaft 19 advances, both the valve plunger 18 and the key unit 21 move forward toward the valve body 7. When the key unit 21 advances, the tip of the throttling unit 23 gradually approaches the opening 16a of the bore 16. Thus, the area of the passage of the variable orifice is gradually decreased. On the other hand, when the valve plunger 18 advances, the first valve seat 27 move away from the valve element 26 of the control valve 24. As the result, the air with atmospheric pressure enters into the second variable pressure chamber 6b through the gap between the valve element 26 and the first valve seat 27, and through the bore 7c and the pathway 17. The air entered into the second variable pressure chamber 6b tends to enter the first variable pressure chamber 5b through the pathway 16. However, because the area of the passage in the variable orifice of the pathway 16 is narrowed down, the flow rate of the air flowing into the first variable pressure chamber 5b is limited. Consequently, most of the air entering through the control valve 24 flows intensively into the second variable pressure chamber 6b. As the result, the pressure in the second variable pressure chamber 6b increases, and the rear power piston unit 11 and the rear diaphragm 13 are operated at relatively earlier stage. Because the valve body 7 advances, the brake booster 1 operates the piston of the master cylinder by generating the output through the output shaft 29. This starts the braking operation.

Figure 4:
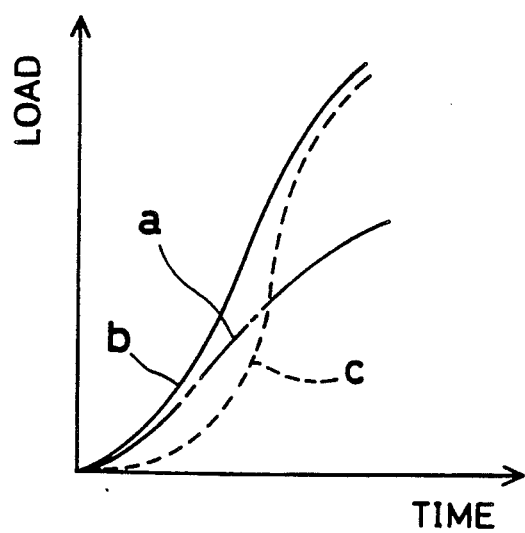
FIG. 4 is a diagram to show the output characteristics of this embodiment and the conventional tandem type negative pressure booster equipment.

As shown in FIG. 4, the output in this case is expressed as solid line b, and the rising occurs earlier than the output of the conventional tandem type brake booster, which is shown by the broken line c. Therefore, the responsiveness of the brake booster 1 in the initial stage of operation can be improved without increasing the opening of the control valve 24 or by expanding the pathway where the air flows.

The left end of the valve plunger 18 touches the reaction disc 30, and the reaction force from the master cylinder is transmitted to the valve plunger 18 through the reaction disc 30. Further, this reaction force is transmitted to the driver through the input shaft 19 and the brake pedal.

As the valve body 7 advances, the key unit 21 moves backward in relation to the valve body 7. As the result, the throttling unit 23 and the opening 16a move away from each other, and the area of the passage in the variable orifice gradually increases. Accordingly, a large quantity of the air flows into the first variable pressure chamber 5b through the opening 16a and the pathway 16. Then, the front power piston unit 10 and the front diaphragm 12 are also operated. As the result, the output is increased, and the braking force also increases.

When the load on the input shaft 19 increases as shown by the dashed line in FIG. 4 as time elapses, the output increases along the solid line b. In this case, this output becomes almost equal to the output of the conventional booster because the pressure in the first variable pressure chamber 5b becomes gradually equal to the pressure in the second variable pressure chamber 6b. In other words, the line b and the line c approximately coincide with each other.

When the brake pedal is released to cancel the braking, the input shaft 19, the valve plunger 18 and the key unit 21 move backward, i.e. rightward, in relation to the valve body 7 the power piston returns to the non-operating position until the key unit 21 touches the rear end wall 20b of the bore 20. When the valve plunger 18 moves backward, the first valve seat 27 touches the valve element 26, and the first and the second variable pressure chambers 5b and 6b are interrupted from the atmospheric air. The valve element 26 moves away from the second valve seat 28, and the first and the second variable pressure chambers 5b and 6b are communicated with the first and the second constant pressure chambers 5a and 6a. As the result, the air in the first and the second variable pressure chambers 5b and 6b flows into the first constant pressure chamber 5a and further flows into the intake manifold through the negative pressure leading-in pipe 34. In this case, the valve plunger 18 is at the most backward position in relation to the valve plunger 18, and the gap between the valve element 26 and the second valve seat 28 is enlarged to utmost extent. Consequently, the air in the second variable pressure chamber 6b rapidly flows. Since the throttling unit 23 and the opening 16a move away widely, the area of the passage in the variable orifice is enlarged up to the maximum. Accordingly, the air in the first variable pressure chamber 5b also flows rapidly. As the result, the valve body 7 and the front and rear power pistons 10 and 11 move rapidly backward by the resilient force of the spring 31.

When the key unit 21 touches the inner surface of the rear shell 3, the valve plunger 18 and the key unit 21 do not move backward any more, while the valve body 7 continues to move backward. When the second valve seat 28 touches the valve element 26, the air in the first and the second variable pressure chambers 5b and 6b stop to flow out, and the front and rear power pistons 10 and 11 do not move backward any more and stops at the backward limit position. Thus, the valve body 7 and the valve plunger 18 are now at the nonoperating position in the initial stage of the operation as shown in the figure.

As the result, the brake booster 1 can also have good responsiveness when the operation is cancelled.

Figure 3:
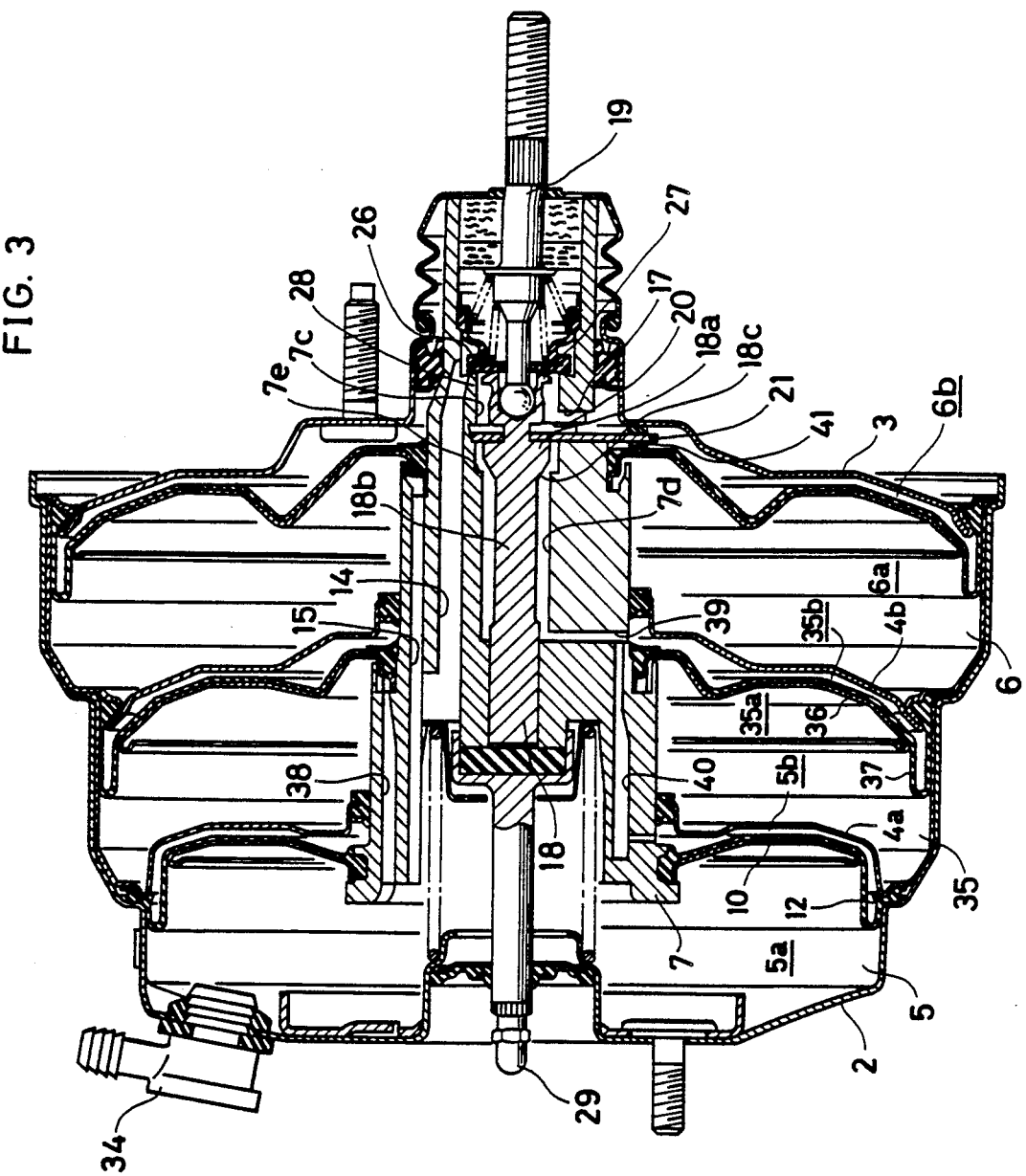
FIG. 3 is a longitudinal sectional view similar to FIG. 1, showing another embodiment according to this invention.

FIG. 3 is a sectional view similar to FIG. 1, showing another embodiment according to the present invention. The explanation will not be given in detail as the components corresponding to the components of the above-mentioned embodiment are identified with the same numbers.

As shown in FIG. 3, the space formed by the front shell 2 and the rear shell 3 is divided by two center plates 4a and 4b into the front chamber 5, the rear chamber 6 and the center chamber 35 between these two chambers 5 and 6. Also, the valve body 7 is slidably and air-tightly supported on two center plates 4a and 4b. The center power piston unit 36 arranged in the center chamber 35 is connected to this valve body 7. The center diaphragm 37 is provided between the shell 2 and the valve body 7 on the backside of the center power piston unit 36. The power piston of this invention is also composed of this center power piston unit 36 and the center diaphragm 37. By this power piston, the center chamber 35 is divided into the third constant pressure chamber 35a and the third variable pressure chamber 35b.

On the valve body 7, a bore 7d with smaller diameter than that of the bore 7c and continuous with the bore 7c is provided. Accordingly, a step 7e is formed between the bores 7c and 7d. The portion of the valve plunger 18 located on the bore 7c is the large-diameter portion 18a, and the portion of the valve plunger 18 located on the bore 7d is the small-diameter portion 18b. Also, on the valve plunger 18 between the large-diameter portion 18a and the small-diameter portion 18b, a truncated conical surface 18c is formed. This truncated conical surface 18c is positioned face-to-face to the step 7e. Consequently, when the valve plunger 18 moves forward in relation to the valve body 7, the gap between the truncated conical surface 18c and the step 7e gradually decreases, and the flow rate of the air flowing through this gap is limited accordingly. Specifically, the variable orifice of this invention is formed by the truncated conical surface 18c and the step 7e.

On the valve body 7, a pathway 38 communicating with the first constant pressure chamber 5a and the third constant pressure chamber 35a is provided. Also, the pathway 39 communicating the bore 7d with the third variable pressure chamber 35b and the pathway 40 communicating this pathway 39 with the first variable pressure chamber 5b are provided on the valve body 7.

The key unit 21 passing through the bore 20 of the valve body 7 can move to axial direction by the predetermined distance in relation to the valve plunger 18, and a stopper 41 made of elastic material such as rubber is mounted on this key unit 21. When this stopper 41 touches inner surface of the rear shell 3, it restricts the further backward movement of the key unit 21. When the further backward movement of the key unit 21 is restricted, the backward movement of the valve body 7 and the valve plunger 18 is restricted by the key unit 21. Thus, the backward limit position of the valve body 7 and the valve plunger 18 are restricted by the key unit 21.

Next, description will be given on the operation of this embodiment.

By pressing the brake pedal, the valve plunger 18 advances through the input shaft 19. Because the truncated conical surface 18c approaches the step 7e when the valve plunger 18 advances, the area of the passage of the variable orifice is gradually decreased. Also, the bore 7c is communicated with the atmospheric air since the first valve seat 27 is immediately separated from the valve element 26. As the result, the air with atmospheric pressure flows into the second variable pressure chamber 6b through the gap between the first valve seat 27 and the valve element 26 and through the bore 7c, the pathway 17 and the bore 20. Also, the air entered into the bore 7c tends to flow into the third variable pressure chamber 35b through the variable orifice, the bore 7d and the pathway 39 and, at the same time, tends to flow into the first variable pressure chamber 5b from the pathway 39 through the pathway 40. In this case, the quantity of the flowing air is restricted by the variable orifice. Accordingly, the most of the air intensively goes into the second variable pressure chamber 6b. Then, the pressure in the second variable pressure chamber 6b rapidly increases, and the rear power piston unit 11 and the rear diaphragm 13 are quickly operated. As the result, the valve body 7 advances, and the brake booster 1 operates the piston of the master cylinder through the output shaft 29. Thus, the braking operation is performed.

When the valve body 7 advances, the truncated conical surface 18c and the step 7e move away from each other, and the area of the passage of the variable orifice gradually increases. As the result, a large quantity of the air is also introduced into the first and the third variable pressure chambers 5b and 35b, and the power piston units 10 and 36 and the diaphragms 12 and 37 are also operated. Consequently, the output of the brake booster 1 is increased.

When the brake pedal is released to cancel the braking operation, the valve plunger 18 moves backward up to the maximum in relation to the valve body 7, and the valve element 26 and the second valve seat 28 move away widely from each other. Thus, the truncated conical surface 18c and the step 7e move away widely. Then, the air in the second variable pressure chamber 6b rapidly flows out, and the air in the first and the third variable pressure chambers 5b and 35b rapidly flows out without being restricted by the variable orifice. As the result, the power pistons and the valve body quickly return to the normal positions.

In this embodiment, the variable orifice is composed of the truncated conical surface 18c formed on the valve plunger 18, while this invention is not limited to this, and a step may be formed on the valve plunger 18 instead of the truncated conical surface 18c, and the variable orifice may be composed of this step and the step 7e of the valve body 7. Also, this embodiment is applicable to the booster equipment, in which the variable pressure chamber is communicated with the atmospheric air when the booster is not operated.

Further, in the two embodiments as described above, the variable orifice gradually decreases the area of the passage of the air when the braking operation is started, whereas it is possible to turn the area of the passage to zero, i.e. to shut off the pathway, when the braking operation is started. In such case, the air flows only into the second variable pressure chamber 6b in the initial stage of the braking operation.

The above two embodiments describe the cases where the negative pressure booster equipment according to this invention is applied to the brake booster, while this invention is also applicable to the other booster equipment such as clutch booster.

As it is evident from the above description, the air is intensively introduced into a variable pressure chamber through the variable orifice when the operation is started in the negative pressure booster equipment according to this invention, and this makes it possible to perform early rising of the output of the negative pressure booster equipment in the initial stage of operation. Also, the area of the passage of the variable orifice is enlarged up to the maximum when the braking is released, and the air can flow freely without any restriction. As the result, the brake pedal can be quickly returned.

Moreover, there is no need to increase the opening of control valve or to enlarge the sectional area of the air passage communicating with the variable pressure chamber.

Therefore, it is possible to obtain high responsiveness of the negative pressure booster equipment at the starting as well as at the cancellation of the braking operation without changing the equipment size from that of the conventional type.

What we claim is:

1. A negative pressure booster equipment, comprising a front shell and a rear shell defining a space therebetween, a predetermined number of center plates dividing said space into two or more chambers, a valve body air-tightly and slidably passing through said center plates, power pistons equal in number to said two or more chambers each arranged to divide said chambers respectively into constant pressure chambers where negative pressure is introduced and variable pressure chambers where air under atmospheric pressure is introduced, a valve plunger with an input shaft connected thereto both slidably mounted within said valve body, communication means for communicating between said constant pressure chambers and said variable pressure chambers, a first pathway for communicating said variable pressure chambers with atmosphere air, control valve means for controlling said communication means and said first pathway, a second pathway communicating between said variable pressure chambers, a variable orifice means provided in said second pathway for varying an amount of air passage to at least one of said variable pressure chambers relative to other variable pressure chambers by gradually decreasing said amount of air passage when said valve plunger is moved forward relative to said valve body and gradually increasing said amount of air passage when said valve plunger is moved backward relative to said valve body.

2. A negative pressure booster as set forth in claim 1, in which the variable orifice means comprises an opening in said second pathway.

3. A negative pressure booster as set forth in claim 2, in which said opening and throttling unit have a truncated conical shape.

4. A negative pressure booster as set forth in claim 1, in which the variable orifice means comprises a step formed between a smaller diameter bore and a larger diameter bore in said valve body, and a truncated conical face formed on said valve plunger.

5. A negative pressure booster as set forth in claim 4, in which said step is formed coaxial with said valve body.

* * * * *